United States Patent
Kühnis, et al.

[15] 3,681,501
[45] Aug. 1, 1972

[54] PHARMACEUTICAL COMPOSITIONS AND METHODS FOR PRODUCING A DEPRESSANT EFFECT ON THE CENTRAL NERVOUS SYSTEM WITH PIPERIDYL BUTANONES

[72] Inventors: Hans Herbert Kühnis, Engelgasse 20, Basel; Ulrich Renner, Talweg 31, Riehen near Basel, both of Switzerland

[22] Filed: Nov. 25, 1970

[21] Appl. No.: 92,906

Related U.S. Application Data

[63] Continuation-in-part of Ser. No. 788,069, Dec. 30, 1968, Pat. No. 3,579,512.

[30] Foreign Application Priority Data

Jan. 11, 1968 Switzerland ....................423/68

[52] U.S. Cl. ..............................................424/267
[51] Int. Cl. .............................................A61k 27/00
[58] Field of Search.......................................424/267

[56] References Cited

UNITED STATES PATENTS

| | | | |
|---|---|---|---|
| 2,850,500 | 9/1958 | Elpern | 260/294.3 |
| 2,880,211 | 3/1959 | Elpern | 260/294.3 |
| 2,904,550 | 9/1959 | Pohland | 260/294.3 |
| 3,043,844 | 7/1962 | Elpern | 260/294.7 |
| 3,081,309 | 3/1963 | Prost | 260/293.4 |
| 3,096,335 | 7/1963 | Elpern | 260/293.4 |
| 3,290,317 | 12/1966 | Carabateas | 260/293.4 |
| 3,338,910 | 8/1967 | Kuhnis et al. | 260/294.3 |
| 3,408,357 | 10/1968 | Kuhnis et al. | 260/294.3 |

*Primary Examiner*—Stanley J. Friedman
*Attorney*—Karl F. Jorda and Bruce M. Collins

[57] ABSTRACT

1-[1-(3-p-Fluorobenzoylpropyl)-4-(2-propinyl)-4-piperidyl]-1-butanone and a pharmaceutically acceptable acid addition salt thereof have a depressant effect on the central nervous; pharmaceutical compositions comprising such compound and a method for producing a depressant effect in mammals are provided.

4 Claims, No Drawings

PHARMACEUTICAL COMPOSITIONS AND METHODS FOR PRODUCING A DEPRESSANT EFFECT ON THE CENTRAL NERVOUS SYSTEM WITH PIPERIDYL BUTANONES

CROSS REFERENCE

This application is a continuation-in-part of our pending application Ser. No. 788,069, filed Dec. 30, 1968 now U.S. Pat. No. 3,579,512.

DETAILED DESCRIPTION

The present invention relates to a novel piperidine derivative and its pharmaceutically acceptable salts, to pharmaceutical compositions containing such compound and to a method of producing a depressant effect on the central nervous system of mammals.

More particularly, the present invention relates to 1-[1. (3-p-fluorobenzoylpropyl)-4-(2-propinyl)-4-piperidyl]-1-butanone having the formula

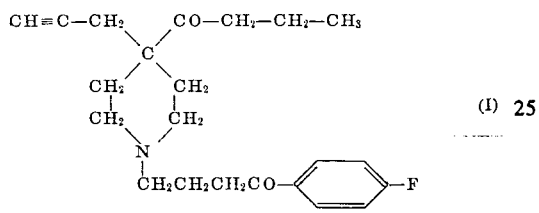

and the pharmaceutically acceptable acid addition salts thereof, which compounds have been found to have a depressant effect on the central nervous system of mammals.

The present invention also pertains to pharmaceutical compositions comprising the compound of formula I or a pharmaceutically acceptable salt thereof and an inert pharmaceutical carrier.

Furthermore, the present invention pertains to a method of producing a depressant effect on the central nervous system of a mammal comprising administering thereto the compound of formula I or a pharmaceutically acceptable acid addition salt thereof.

To produce the new piperidine derivative of formula I and its addition salts, the compound of formula

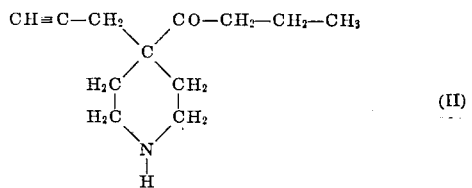

reacted with a reactive ester of the compound of formula

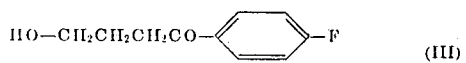

and, optionally, the obtained compound of formula I is converted into an addition salt with an inorganic or organic acid. The reaction is carried out at room temperature or at a moderately increased temperature in a suitable organic solvent, such as, e.g., ethanol, acetone, diethyl ketone or dimethyl formamide. Optionally, the reaction is accelerated by the addition of acid binding agents, such as e.g., potassium carbonate, and/or catalysts, such as, e.g., potassium iodide. Suitable reactive esters of the compound of formula III are, in particular, hydrohalic acid esters, such as bromides, chlorides and iodides, also arene sulfonic acid esters, e.g., p-toluene sulfonic acid esters. The starting material of formula II is a new compound, the production of which is performed as follows.

Isonipecotic acid ethyl ester is treated in the presence of 1N sodium bicarbonate solution with chloroformic acid benzyl ester to give 1-benzyloxycarbonylisonipecotic acid ethyl ester, which is further reacted in form of its alkali metal salt with (2-propinyl)-halide, e.g., a bromide or iodide, whereby the 4-(2-propinyl)-1-benzyloxycarbonyl isonipecotic acid ethyl ester is formed. Suitable as reaction medium is, for example, a mixture of absolute diethyl ether or tetrahydrofuran with 1,2-dimethoxyethane. The required alkali metal compounds of 1-benzyloxycarbonyl isonipecotic acid ethyl ester are produced in situ from other suitable alkali metal compounds. Particularly suitable is for example triphenylmethyl lithium, which is formed, likewise in situ, from phenyl lithium in ether by adding a solution of triphenyl methane in 1,2-dimethoxyethane. Phenyl lithium is produced in a known manner from bromobenzene and lithium in ether. Since the triphenylmethyl lithium produces intensively colored solutions, its formation and also its consumption by the subsequently added 1-substituted isonipecotic acid ester can be easily followed. In place of triphenylmethyl lithium, it is also possible to use, for example, triphenylmethyl sodium or potassium. The aforementioned stages of the process are for the most part slightly exothermic and can be carried out at room temperature or at slightly elevated temperature. It may also become necessary that the reaction mixture depending on the starting materials and amounts thereof used, is to be cooled.

The obtained 4-(2-propinyl)-1-benzyloxycarbonyl isonipecotic acid ethyl ester is further treated with hydrogen bromide in glacial acetic acid to split off the carbobenzyloxy group to give 4-(2-propinyl)-isonipecotic acid ethyl ester. The latter compound is subjected to a Grignard reaction with a propyl magnesium halide, advantageously propyl magnesium bromide, conventionally prepared from magnesium and propyl bromide in ether. The Grignard reaction is performed under the usual conditions, i.e., at room temperature. Suitable as reaction media are the normal appropriate organic solvents containing ether oxygen which are used for producing the magnesium organic compound. Besides diethyl ether also dibutyl ether or tetrahydrofuran, eventually in admixture with other inert solvents such as benzene or toluene, can be used. Optionally, the reaction temperature is raised towards the end of the reaction by distilling off the ether from its mixture with the other inert higher boiling solvents. The decomposition of the direct reaction products is carried out in a common manner, e.g., with water and dilute hydrochloric acid. The compound of formula II formed in this way is isolated with toluol from the basic reaction medium by conventional methods.

The piperidine derivative of formula I obtained according to the process of the invention is transformed into acid addition salts via conventional methods. For example, the compound of formula I dissolved in an organic solvent such as diethyl ether, methanol, ethanol or the like is treated with the desired acid or a solution thereof, whereupon the salt which precipitates either directly or after addition of a second organic liquid, such as diethyl ether, is isolated.

In pharmaceutical compositions, instead of the free bases, the pharmaceutically acceptable acid addition salts of the compound of formula I can be used. Advantageously, the salts of those acids are used which, by themselves in the dosage amounts in question, have either no or a desired pharmacological action.

Furthermore, it is of advantage if the salts to be used as active substances, crystallize well and are not, or only slightly, hygroscopic. Hydrochloric acid, hydrobromic acid, sulfuric acid, phosphoric acid, methane sulfonic acid, ethane sulfonic acid, $\beta$-hydroxyethane sulfonic acid, acetic acid, malic acid, tartaric acid, citric acid, lactic acid, succinic acid, fumaric acid, maleic acid, benzoic acid, cyclohexylamine sulfonic acid or 1,5-naphthalene disulfonic acid, for example, can be used.

The compounds of the present invention have a depressant effect on the central nervous system of mammals upon oral, rectal or parenteral administration. For example they reduce mobility, have a cataleptic effect, lower the body temperature, antagonise the action of amphetamine and apomorphin, have a positive effect in the last "test de la traction" and inhibit the serotonin edema. These pharmacological properties are determined in experimental animals by various standard test methods [cp. R.Domenjoz and W. Theobald, Arch.int. Pharmacodyn. 120, 450(1959); W. Theobald et al., Arch.int.Pharmacodyn. 148, 560(1964); W. Theobald et al., Arzeneimittelforschung 17, 561 (1967)].

Thus, merely by illustration it is demonstrated that the fumarate of the compound of formula I, upon intraperitoneal administration in amounts of about 3.8 mg/kg to mice, decrease the spontaneous orientation mobility to a very considerable extent.

The same compound administered in amounts of about 10 mg/kg intraperitoneally to rats causes a cataleptic effect.

The toxicity of the compounds of the invention is advantageously low.

These pharmacological properties, indicating in particular neuroleptic activity, render the compounds of the invention suitable for the treatment of psychoses and states of tension and agitation of various origin. For their intended use the compounds of the invention are administered in dosages depending on the manner of administration, on the weight, age and the particular condition of the individual being treated. In general the daily dosage of the free base or of a pharmaceutically acceptable salt thereof will vary between about 0.5 to about 3 mg/kg for mammals.

The compounds of the present invention are administered parenterally or orally to achieve a depressant effect on the central nervous system, in any of the usual pharmaceutical forms. These include solid and liquid unit oral dosage forms such as tablets, capsules, powders, suspensions, solutions, syrups and the like, including sustained release preparations, and fluid injectable forms such as sterile solutions and suspensions. The term dosage form as used in this specification refers to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units. In general such units will contain 1–100 mg of an active substance according to the invention. Dosage units for oral administration preferably contain between 1 and 90 percent of the active substance. Ampoules for parenteral, particularly intramuscular, also intravenous, administration preferably contain a water soluble salt of a compound of formula I as active substance in a concentration of, preferably, 0.5–5 percent, optionally together with a suitable stabilizer, in aqueous solution.

Powders are prepared by comminuting the compound to a suitably fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into the desired form. A powder mixture is prepared by mixing the compound, suitably comminuted, with a diluent or base such as starch, sucrose, kaolin, dicalcium phosphate and the like. The powder mixture can e granulated by wetting with a binder such as syrup, starch paste, acacia mucilage or solutions of cellulosic, or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat or shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions and emulsions can be formulated by dispersing the medicament in a non-toxic vehicle.

For parenteral administration, fluid unit dosage forms can be prepared by suspending or dissolving a measured amount of the compound in a non-toxic liquid vehicle suitable for injection such as an aqueous or oleaginous medium. Alternatively a measured amount of the compound is placed in a vial and the vial and its contents are sterilized and sealed. An accompanying vial or vehicle can be provided for mixing prior to administration.

The following examples will serve to further typify the nature of the present invention, but should not be construed as a limitation on the scope thereof. Temperatures are given in degree Centigrade.

EXAMPLE 1

To EXAMPLE solution of a Grignard reagent, prepared in the usual manner from 2.21 g of magnesium and 10.82 g of propyl bromide in 35 ml of abs. ether, is added dropwise a solution of 4.14 g of 4-(2-propinyl)-isonipecotic acid ethyl ester in 25 ml of abs. ether. After addition of 45 ml of abs. toluence the ether is distilled off. The reaction mixture refluxed for 15 hours, cooled and decomposed with water and 2N hydrochloric acid. Ether is added and the organic phase is separated and shaken thoroughly with concentrated ammonia and brine, then dried and concentrated. The residue consisting of 1.8 g of crude 1-[4-(2-propinyl)-4-piperidyl]-1-butanone is immediately refluxed for 12 hours with 2.2 g of 3-p-fluorobenzoyl-propyl chloride, 3 g of sodium carbonate and a little sodium iodide in 25 ml of 3-pentanone. The reaction mixture is filtered, concentrated by evaporation and the residue taken up in methylene chloride. The methylene chloride solution is likewise filtered, concentrated and the residue is chromatographed in silica gel. The obtained 1-[1-(3-p-fluorobenzoylpropyl)-4-(2 — propinyl)-4-piperidyl]-1-butanone is treated in ether with 95 percent of the theoretical amount of fumaric acid to give the fumarate, M.P. 146°–148°.

The 4-(2-propinyl)-isonipecotic acid ethyl ester required in the above example is produced as follows:

a. 2.03 g of lithium wire cut into small pieces are added under nitrogen to 22.8 g of bromobenzene in 180 ml of ether while stirring in a 750 ml four-necked flask, whereby the ether commences to boil. After the reaction has subsided, the mixture is refluxed for a further 2½ hours. 35.4 g of triphenylmethane in 150 ml of abs. 1,2-dimethoxyethane are added all at once to the obtained solution of phenyl lithium, whereby the solution becomes dark red in color, due to the formation of triphenylmethyl lithium, and gently boils. After stirring at room temperature for 20 minutes, 42.3 g of 1-benzyloxycarbonyl isonipecotic acid ethyl ester (produced by reaction of isonipecotic acid ethyl ester with chloroformic acid benzyl ester in the presence of 1N sodium bicarbonate solution) in 50 ml of absolute ether are added at 28°. The dark red solution loses its color, accompanied by a slight increase in temperature. The solution is stirred for 10 minutes at room temperature and then mixed all at once with 18.0 g of 2-propinyl bromide in 40 ml of abs. ether. The mixture is stirred for 2½ hours at room temperature, whereby it assumes a yellowish color and lithium bromide precipitates. The reaction mixture is then decomposed with 40 ml of water and evaporated almost to dryness. The residue is taken up in 50 ml of ether and the obtained ether solution extracted three times with 2N hydrochloric acid. The ether solution is then dried and concentrated and the residue left standing over night, whereby the triphenyl methane crystallizes out. The whole mixture is suspended in cold methanol, the triphenyl methane filtered off by suction and the filtrate concentrated. The residue is distilled in high vacuum, whereby the 1-benzyloxycarbonyl-4-(2-propinyl)-isonipecotic acid ethyl ester converts at 170°–192 °10.07 Torr.

b. 8.0 g of 1-benzyloxycarbonyl-4-(2-propinyl)-isonipecotic acid ethyl ester are stirred with 40 ml of a saturated solution of hydrogen bromide in glacial acetic acid and 9 ml of abs. ether in a 100 ml round flask for 2 hours. The initially intense evolution of carbon dioxide gradually subsides. The solution is then concentrated in the rotary evaporator and the residue taken up in 6N hydrochloric acid. The acidified solution is washed with ether, made alkaline, while cooling well, with concentrated ammonia solution and extracted with chloroform. The chloroform solution is dried, concentrated and the 4-(2-propinyl)-isonipecotic acid ethyl ester, which remains behind, is further reacted as quickly as possible.

The following prescriptions further illustrate the production of forms for administration according to the invention:

EXAMPLE 2

5 g of 1-[1-(3-p-fluorobenzoyl-propyl)-4-(2-propinyl)-4-piperidyl]-1-butanone fumarate, 30 g of lactose and 5 g of highly dispersed silicic acid are mixed. The mixture is moistened with a solution of 5 g of gelatine and 7.5 g of glycerin in distilled water and is then granulated through a sieve. The granulate is dried, sieved and carefully mixed with 3.5 g of potato starch, 3.5 g of talcum and 0.5 g of magnesium stearate. The mixture is used to press out 1,000 tablets each weighing 60 mg and each containing 5 mg of active substance.

EXAMPLE 3

5 g of active substance, e.g. 1-[1-(3-p-fluorobenzoyl-propyl)-4-(2-propinyl)-4-piperidyl]-1-butanone fumarate, 15 g of lactose and 20 g of starch mixed. The mixture is moistened with a solution of 5 g of gelatine and 7.5 g of glycerol in distilled water and is then granulated through a sieve. The granulate is dried, sieved and carefully mixed with 3.5 g of talcum and 0.5 g of magnesium stearate. The mixture is used to press out 1,000 dragee cores. These are subsequently coated with a concentrated syrup made from 26.66 of crystallized saccharose, 17.5 g of talcum, 1 g of shellac, 3.75 g of gum arabic, 1 g of highly dispersed silicic acid and 9.090 g of dyestuff, and dried. The obtained dragees each weigh 110 mg and each contain 5 mg of active substance.

EXAMPLE 4

To produce 1,000 capsules each containing 10 mg of active substance, 10 g of 1-[1-(3-p-fluorobenzoylpropyl)-4-(2-propinyl)-4-piperidyl]-1-butanone fumarate are mixed with 263 g of lactose. The mixture is evenly moistened with an aqueous solution of 2 g of gelatine and is granulated through a suitable sieve (i.e., sieve III, Ph.Helv. V). The granulate is mixed with 10 g of dried maize starch and 15 g of talcum and is then evenly filled into 1,000 hard gelatine capsules, size 1.

EXAMPLE 5

A suppository mixture is prepared from 2.0 g of 1-[1-(3-p-fluorobenzoylpropyl)-4-(2-propinyl)-4-piperidyl]-1-butanone fumarate and 168.0 g of adeps solidus and the mixture used to fill 100 suppositories each containing 20 mg of active substance.

EXAMPLE 6

500 mg of 1-[1-(3-p-fluorobenzoylpropyl)-4-(2-propinyl)-4-piperidyl]-1-butanone fumarate and 2.2 g of glycerol are dissolved in distilled water made up to 100 ml. The solution is used to fill 100 ampoules each of 1 ml and each containing 5 mg of active substance.

What is claimed is:

1. A pharmaceutical composition comprising a depressant effective amount of 1-[1-(3-p-fluorobenzoylpropyl)-4-(2-propinyl)-4-piperidyl]-1-butanone, or a pharmaceutically acceptable acid addition salt thereof, and an inert pharmaceutical carrier.

2. A composition according to claim 1 wherein the active ingredient is in the form of its fumarate salt.

3. The method of producing a depressant effect on the central nervous system of a mammal comprising administering to said mammal a depressant effective amount of a compound according to claim 1.

4. The method of producing a depressant effect on the central nervous system of a mammal comprising administering to said mammal a depressant effective amount of a compound according to claim 2.

* * * * *